US010943196B2

(12) United States Patent
Li et al.

(10) Patent No.: US 10,943,196 B2
(45) Date of Patent: Mar. 9, 2021

(54) DATA RECONCILIATION

(71) Applicant: ACCENTURE GLOBAL SOLUTIONS LIMITED, Dublin (IE)

(72) Inventors: Chung-Sheng Li, San Jose, CA (US); Emmanuel Munguia Tapia, San Jose, CA (US); Jingyun Fan, Berkeley, CA (US); Priyankar Bhowal, Gurgaon (IN); Mohammad Ghorbani, Foster City, CA (US); Abhishek Gunjan, Bangalore (IN); David Clune, Knoxville, TN (US); Sumraat Singh, Faridabad (IN); Samar Alam, Patrarganj (IN)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 302 days.

(21) Appl. No.: 16/030,301

(22) Filed: Jul. 9, 2018

(65) Prior Publication Data

US 2020/0012980 A1    Jan. 9, 2020

(51) Int. Cl.
*G06Q 10/06* (2012.01)
*G06N 5/04* (2006.01)
*G06N 20/00* (2019.01)

(52) U.S. Cl.
CPC ....... *G06Q 10/06313* (2013.01); *G06N 5/048* (2013.01); *G06N 20/00* (2019.01)

(58) Field of Classification Search
None
See application file for complete search history.

(56) References Cited

U.S. PATENT DOCUMENTS

| 2005/0044015 | A1* | 2/2005 | Bracken | G06Q 40/00 705/30 |
| 2013/0085902 | A1* | 4/2013 | Chew | G06Q 40/10 705/30 |
| 2017/0116679 | A1* | 4/2017 | Abraham | G06Q 40/12 |
| 2019/0080248 | A1* | 3/2019 | Kohli | G06N 5/045 |
| 2019/0251058 | A1* | 8/2019 | Robinson | G06Q 40/06 |

OTHER PUBLICATIONS

Efficient Data Reconcilation; Cochinwala et al; Oct. 20, 2000 (Year: 2000).*
Using Machine Learning to Solve Data Reconciliation Challenges in Financial Services; Lawrence Klamecki; Mar. 19, 2018 (Year: 2018).*

* cited by examiner

*Primary Examiner* — Dierdre D Hatcher
(74) *Attorney, Agent, or Firm* — Mannava & Kang, P.C.

(57) ABSTRACT

Data from multiple sources may be gathered continuously to perform reconciliation operations. The data items in a first data set may be matched with those in the second data set using a data matching technique. Based on the matching, a confidence score indicative of an extent of match between the data items in the data sets may be generated. Based on the confidence score and predefined thresholds, it may be ascertained if the data items are reconciled. The non-reconciled items in at least one of the first data set and the second data set may be classified in a classification category, based on an artificial intelligence based technique, the classification category being indicative of an explanation of a non-reconciled data item being non-reconcilable. When the data item is not reconciled and classified, the data item is identified as an open item for further analysis.

17 Claims, 11 Drawing Sheets

205

| Cheque Reference | PrevPeriod | Date | Description | Amount |
|---|---|---|---|---|
| | FALSE | 1/5/2017 | DEPOSIT | 7,024.39 |
| | FALSE | 9/4/2017 | TRASPASO REF 23432017 AUT. 28414 02343 20017 00328414 | 12.00 |
| | FALSE | 9/4/2017 | NOM INCAPAC0AD SEPT P INT 0040917 00030261 | 2.00 |
| 8573 | FALSE | 9/8/2017 | COBRO CHEQUE NUMERO 8573 0000008573 00005709 | -5502.17 |
| | FALSE | 9/8/2017 | COMISION SINPE - CRD | -437.25 |

| Cheque Reference | PrevPeriod | Date | Description | Amount | source-id 235 | source-name 240 | matching-id 230 | matching-confidence | matching-comment 245 |
|---|---|---|---|---|---|---|---|---|---|
| | | | | | | | OUTPUT 225-1 | | |
| | FALSE | 1/5/2017 | DEPOSIT | 7,024.39 | 1 | General Ledger | | 100.0 | 1:1 match contextualized with description |
| | FALSE | 9/4/2017 | TRASPASO REF 234320017 AUT 29414 0214320017 00328414 NOM MC APACC/AD SEPT P INT | 12000 | 1 | General Ledger | | 100.0 | 1:N match with amount only |
| | FALSE | 9/4/2017 | 0040817 00000281 CO BR O CHEQUE NUMERO 8873 | 2000 | 1 | General Ledger | | 100.0 | N:N match with amounts only |
| 8573 | FALSE | 9/8/2017 | 00000008573 00005729 | 6502.2 | 1 | General Ledger | | 111.5 | N:N group-by contextualized with cheque reference |
| | FALSE | 9/8/2017 | COMISION SMPE - CRD | 497.28 | | | | | |

FIG. 2b

| Source ID | Journal ID | Description | Div | BU | Cheque Reference | Source | Amount | Line Des | Op Unit | revPerio | DeptID | Date | User | source-id 235 | source-name 240 | matching-id 230 | matching-confidence | matching-comment 245 |
|---|---|---|---|---|---|---|---|---|---|---|---|---|---|---|---|---|---|---|
| MGL Daily | 5789635 | Prior Period-Deposit in transit | 33 | X0121 | | 7T7 | 7,024.39 | | 337T7 | FALSE | 410 | 1/2/2017 | EHERN40 | 2 | Bank Sta | 1000 | 1 | 1:1 match contextualized with description |
| MGL Daily | HC6341469 | Accounts Payable | 39 | XMQ4F | | HC9 | 10000 | MBS Acc | 39Q4F | FALSE | 410 | 9/29/2017 | BATCH | 2 | Bank Sta | 1003 | 1 | N:N match with amount only |
| MGL Daily | HC6341469 | Accounts Payable | 39 | XMQ4F | | HC9 | 4000 | MBS Acc | 39Q4F | FALSE | 410 | 9/29/2017 | BATCH | 2 | Bank Sta | 1003 | 1 | N:N match with amount only |
| | HC6340455 | FRANCISCO JAVIER ESTRADA CARMONA | | | 8573 | | -1376.6 | | 39Q4F | FALSE | 410 | 8/31/2017 | | 2 | Bank Sta | 1115 | 1 | N:N group-by contextualized with cheque reference |
| | HC6340455 | FRANCISCO JAVIER ESTRADA CARMONA | | | 8573 | | -4125.6 | | 39Q4F | FALSE | 410 | 8/31/2017 | | 2 | Bank Sta | 1115 | 1 | N:N group-by contextualized with cheque reference |
| MGL Daily | 6908283 | XM046 Cashier Ticket Day 21- bbrav581 | 39 | XM046 | | | 17250 | VOID CK | 39046 | FALSE | 410 | 9/21/2017 | BBRAV58 | 2 | Bank Sta | 10000 | 1 | Deposit in Transit |
| 5799028 | 5799028 | Return Checks | 33 | X0121 | | H88 | 654.66 | | 337T7 | FALSE | 411 | 1/6/2017 | EHERN408 | | | | | |

FIG. 2c

DATA RECONCILIATION

BACKGROUND

Reconciliation is one of the Record-to-Report processes performed during corporate finance and accounting operations. For example, in corporate financing, reconciliation is performed between bank statements and cash accounts within a general ledger, between a ledger and a sub-ledger, between intercompany ledgers, and between multiple Enterprise Resource Planning (ERP) systems.

Generally, the purpose of reconciliation is to ensure that figures in two sets of records are correct and in agreement. The reconciliation may be required because each accounting process usually incurs multiple accounting events, and results in multiple recordings in different parts of the general ledger. Additional reconciliations may occur in order to cash processes, where payments are reconciled with invoices as well as in procure-to-pay processes where reconciliation may be performed among invoices, purchase orders, and goods/services received.

Thus, reconciliation typically involves the gathering of data from multiple sources, such as banks and general ledgers of various companies. Furthermore, the gathered data may be matched, based on the type of reconciliation to be performed. For instance, each item in a general ledger may be matched with each item in a bank statement. The reconciliation is generally performed at the close of a reporting period, which is generally at the end of the month or the end of the quarter.

Due to the large volume of data and complex reconciliation process, the reconciliation is cumbersome, resource intensive, and requires substantial human intervention. The reconciliations have been one of the most labor-intensive processes in spite of the availability of automatic matching tools. For instance, there may be multiple sub-systems, such as Account payables (AP), Opera, and Fintech for reconciliation, and each sub-system may have different data formats and account processes, thereby making reconciliation between such systems complex and resource intensive. In fact, accommodation of complex rules for even a single process may demand major redevelopment of a tool turning it into a non-scalable solution. Further, since, the reconciliation can generally be performed only at period end, errors may propagate in multiple records, thereby making the process more complex and resource intensive.

This presents a technical problem of devising a reconciliation mechanism that may efficiently perform reconciliation among records in an organization to reduce cost (computational and otherwise), minimize computational and other errors, and better utilize manual and computational time and resources.

BRIEF DESCRIPTION OF DRAWINGS

Features of the present disclosure are illustrated by way of examples shown in the following figures. In the following figures, like numerals indicate like elements, in which:

FIGS. 2a-2c illustrate an example data set for performing reconciling operations by the reconciliation system, according to an example embodiment of the present disclosure;

DETAILED DESCRIPTION

Figure 1:
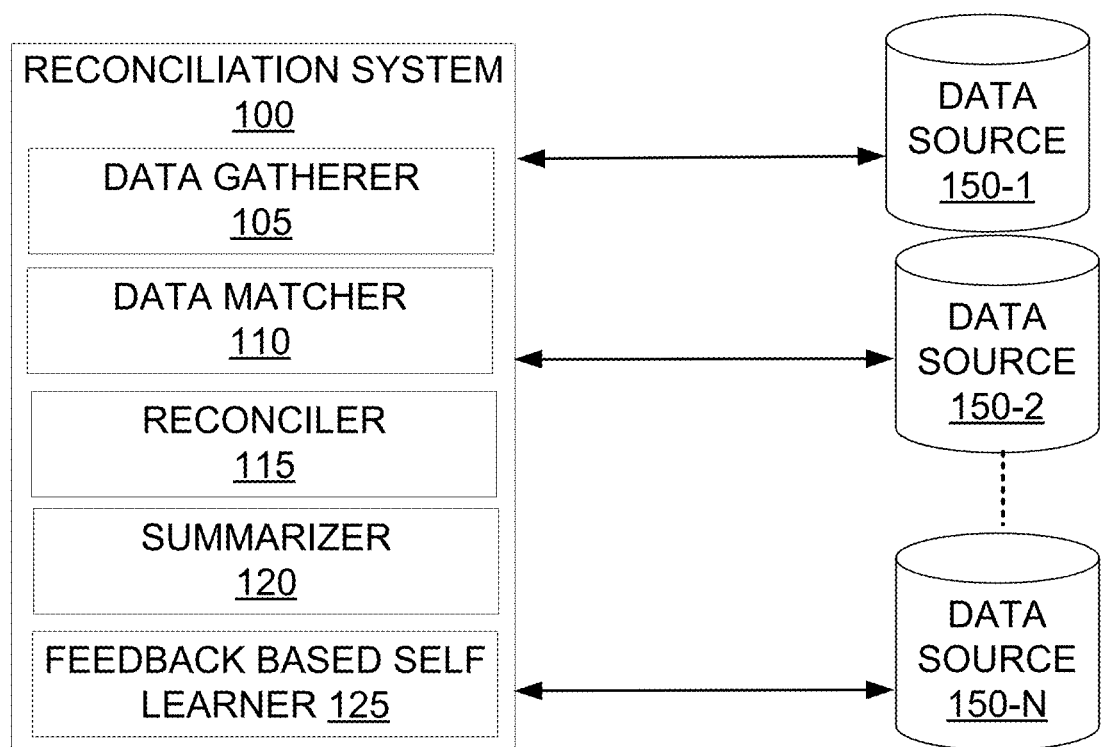
FIG. 1 illustrates a block diagram of a reconciliation system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on.

The present disclosure describes systems and methods for continuous reconciliation of data, such as financial and accounting data in an organization. The present disclosure may provide for continuous reconciliation of data from multiple sources, such as bank statements (cash), general ledger of an organization, intercompany ledgers, and sub-ledgers of various units of an organization. According to as aspect of the present disclosure, "continuous" may refer to real-time reconciliation or as soon as a new entry is detected in any of the sources. To perform continuous reconciliation, a virtual closing of an account may be performed at the end of a selected period, which may provide for reconciliation to be performed on virtually closed accounts and an adjustment, if any, may be performed at the end of the month or period close.

Thus, as against a period end, which is generally on a month or a quarter basis, the reconciliation may be performed on a continuous basis (a day/a week/any user defined period) to remedy deficiencies in a timely manner and to prevent such errors from propagating further. The present disclosure provides for such continuous reconciliation in a time and resource efficient manner with minimum intervention by an external agent, such as, a human resource. The disclosed techniques may also utilize fewer computing resources such as processing power and memory, because reconciliation is performed on a more frequent basis, thereby by requiring less processing power to process the data and less memory to store the data.

In an example, a first data set from a first source and a second data set from a second resource may be continuously gathered. For example, in case continuous bank reconciliation is to be performed, the first source may be general ledger and the second source may be a bank statement. The data may be gathered based on continuous polling or an alert based mechanism to notify generation of a new reconciliation item.

Upon receiving the first data set, it may be determined if it includes any items that are to be reconciled, for instance, it may be determined if there is new accounting event, which may include new account items, such as new account payables or new account receivables, and new entries on external data sources. Accordingly, the first data set may be reconciled as explained in subsequent paragraph(s).

To perform reconciliation, the first data set may be continuously matched with the second data set, using a data matching technique. The data matching technique may include precise matching techniques, fuzzy matching techniques, rule based matching including one to one, one to many, many to one, and many to many matching. Further, data matching technique may perform self-matching, rule based matching, and/or machine learning based matching.

The self-matching may be performed in items extracted from source of data, based on various parameters, such as amount. The self-match may help in identify canceled items or duplicate items. The rules based matching may include one to one, one to many, many to one, and, many to many match, based on various rules. The machine learning based match may be based on rules, which are evolved as the system performs reconciliation over a period of time. The data matching techniques may be perform an exact match or a context based match, which may use supporting features like certain keyword words in description text, or source from where the posting was done, or department, to determine best match.

In an example, the matching may include filtering each of the first data set and the second data set to identify one or more data items, which may be grouped as a single record, based on filtering criteria. The filtering criteria are indicative of basis on which the one or more items in the first data set are to be combined. The filtering criteria may be for example, date or account type. Thus, this way, one to one, one to many, many to one, and many to many matching may be performed.

The filtered data from the first data set and the second data set may be compared to determine an extent of match. Further, based on matching a confidence score may be generated. The confidence score may be indicative of extent of match between the one or more items in the first data set and the second data set. Based on the confidence score, it may be determined whether the first data set is reconciled. For instance, a confidence score greater than a threshold may indicate that the items in the data set can be considered to be reconciled.

The items that are not reconciled may be summarized by classifying such items into a classification category. The category may be indicative of a possible reasoning explaining the mismatch. Such, reasoning may be considered similar to a hypothesis explaining why the items may not be reconcilable. The classification categories may be such as, outstanding account payables (AP-OC), bank service fee (BK-SF), and the like. Thus, the items that cannot be reconciled may be analyzed to determine a reason for not being able to reconciled and accordingly may be classified into a corresponding category. For instance, bank service levied by a bank would not appear in a general ledger of an organization, and for the same reason cannot be reconciled. Further, the items that cannot be reconciled or summarized may be marked as open item for further analysis by an external agent.

Thus, the present disclosure provides a comprehensive approach for providing automated continuous reconciliation. The present approach may be substantially reduced manual intervention and hence possibilities of errors due to the manual dependencies are eliminated. This would lead to high accuracy and high efficiency of the reconciliation. Moreover, as the reconciliation may be performed in a continuous manner, the errors propagating into multiple records/data items are substantially reduced. As the reconciliation may be performed continuously with intelligent and efficient reconciliation techniques, the reconciliation may not be as complex and labor intensive as in cases, where reconciliation may be performed at period end.

Further, the present approach is capable of handling and reconciling data of multiple data sources. Furthermore, the system has the capability to handle one-to-many matching scenarios by filtering out transactions based on the classification, date or any such criterion, which would reduce the number of transactions to be considered for one-to-many match. This would in turn reduce the computational time of the system.

Moreover, the system may provide reasons for matching or not matching of data items. Therefore, in case of any doubt, the user doesn't have to look at the data itself, but just has to look at the reasons provided by the system for the mismatch between the data items. Therefore, the present disclosure offers a tool that is flexible yet capable of handling complex continuous reconciliation. Thus, the present disclosure provides a comprehensive, flexible, economic, and time-effective approach for continuous reconciliation.

FIG. 1 illustrates a reconciliation system 100 for reconciling data, such as financial and accounting data, in an organization, according to an example embodiment of the present disclosure. In an example embodiment, the reconciliation system 100, hereinafter referred to as system 100, uses a combination of Artificial Intelligence (AI) and machine learning techniques to perform a variety of operations associated with reconciliation.

In an example, the system 100, amongst other things, includes a data gatherer 105, a data matcher 110, a reconciler 115, a summarizer 120, and a feedback based self learner 125. The system 100 may also be in communication with multiple data sources 150-1, 150-2, . . . 150-N, collectively referred to as data sources 150. The data sources 150 may be internal or external to the system. For instance, a data source 150 having general ledger may be internal to the system, while a data source 150 providing bank transactions related information may be external to the system 100. The data sources 150 may provide, for example, general ledger of an organization, a bank statement for an account help by a department or by the organization, intercompany ledgers, and sub-ledgers.

A general ledger may be for an over-all account of an organization, providing a holistic view of the organizations financial status. Two entities of the same organization, for instance, at different geographical locations or dealing with different domains, may have intercompany ledgers. A sub-account of an account corresponding to a general ledger may have a sub-ledger, for instance, an account dealing with salaries, an account dealing with on-site budgets, or an account dealing with meals, may have a separate sub-ledger. In another example, separate units/departments may also have separate sub-ledgers.

In operation, the data gatherer 105 may continuously gather data from the data sources 150. As the reconciliation is performed between two sets of data, for the sake of explanation, the reconciliation is explained further with respect to a first data set obtained from a first data source, say, the data source 150-1 and a second data set obtained from the second data source, say, the data source 150-2. It will be appreciated the first data source and the second data source may be any of the data sources mentioned above.

In an example, continuous gathering of data refers to nearly real-time gathering of data, as against period end (monthly/quarterly) gathering. The data gatherer 105 may obtain data based on regular polling or based on an alert mechanism, where an alert or a notification may be generated every time a new account event is detected. An account event may be a new account payable (AP), a new account receivable (AR), a new accrual, a new journal entry (JE); or a new record entry in an external data source, such as a bank statement.

The data gatherer 105 gather data through robotic process automation (RPA), direct application programming interface (API) invocation, extract transform load (ETL) from a data warehouse or a database, or file transfer protocol (FTP)/ secure FTP (SFTP). Thus, the data gatherer 105 may continuously gather data for reconciliation from various data sources 150. The data gatherer 105 may convert the data obtained from multiple data sources into a standard format, such as, json, for appropriate comparison.

Upon gathering data, the data matcher 110 may determine whether the gathered data is for new reconciliation. For instance, the gathered data may correspond to records, which are not to be reconciled. These may include, for example, data that is more than twelve months old records that may be reconciled separately by a separate unit. On determining that the data is to be reconciled, i.e., it corresponds to new reconciliation, the data matcher 110 may provide for reconciliation, viz., bank and general ledger reconciliation, intercompany reconciliation, and ledger to sub-ledger reconciliation.

In an example, the data matcher 110 may implement one or more data matching techniques for comparing the first data set with the second data set. Further, an order in which the data matching techniques are to be implemented may be predefined, may be configured by a user, or dynamically adjusted by the system 100, based on a type of reconciliation to be performed.

The data matching techniques may include self-match techniques, rule-based techniques, and machine learning based matching. Each of these techniques may include precise match and fuzzy match. Further, the rule-based match and the machine learning based match may include one to one match, one to many match, many to one match, and many to many match. The data matcher 110 may perform two way matching or three way matching.

The two way matching for Report To Report (RTR) may be between bank statement and cash account of general ledger, between ledger and sub-ledger, inter-companies, and between different ERP systems. The two way matching for may be between invoice and purchase order, and the two way matching for cash app may be between checks and account receivable.

The three way matching for bank- and cash may be performed among bank statement, cash account of general ledger, and cash account. The three-way matching for Procure to Pay (PTP) may be performed among invoice, goods received, and purchase order; and the three-way matching for cash app may be performed among checks, remittance advisor, and account receivable.

The self-match techniques attempt to reconcile those entries where there was reversal w.r.t. a posting. The self-match may be field based or may be context based. The field based may in turn can be based on precise match or an approximate match. For example, the self-match may be performed within the same source using only amount field. Likewise, any other field/parameter may be used for matching. In said example, the self-matching techniques may only use a field/parameter for matching and no context may be used. In another example, where only amount field may be used for matching, the best match may be determined by selecting the items in the same data source with sum substantially close to the items of the items to be matched. The closer the sum of the items to each other, the more precise is the match, and therefore higher may be the score, as explained later.

In context based self matching technique, the data matcher 110 may use supporting features, such as, certain words inside description text, or source from where the posting was done, or department, etc. to determine most suitable match. The context based matching aims to determine approximate match.

In rule based match one to one, one to many, many to one, and many to many record matching may be performed. Like self match, rule based match may also be field-only based match, context based match, and field with context match. For instance, data items from the first data set may be matched with data items in second data set, using account field. For example, in one to one match, one line item in the first data set may be matched with one line item in the second data set using amount filed only. Such a field based matching may be performed with or without considering context. As mentioned before, for context based matching, supporting features may be used.

In another example of context based matching, many to many matching may be performed by grouping of information on one or more features, such as source, department, date, or check number to get the best matching record between two different data sources. The best matching record may be the one with maximum number of line items matching. For instance, for such a probability based match may be performed based on scoring model. Likewise, one to one, one to many, many to one matching may be performed.

The data matcher 110 may also perform machine learning based matching, where feedback provided by a user may be used to continuously learn various matching criteria, as explained in detail with reference to description of feedback-based self learner 125.

Referring to cases, where many items may be grouped, the data matcher 110 may perform filtering, based on various criteria to determine such items that may be grouped together for reconciliation. The filtering criteria being indicative of basis on which the one or more items in the first data set are to be combined. As mentioned above, the supporting features, such as, certain word inside description text, a data source 150 from where the posting was done, or department may be considered for grouping as a filtering criteria. Accordingly, the data matcher 110 may also implement natural language processing (NLP) techniques and text mining techniques to perform such grouping.

Based on the matching and a scoring technique to be implemented, the data matcher 110 may also score each match. The data matcher 110 may associate a confidence score with each match, where the confidence score may be indicative of an extent of match between two items. Based on the nature of match, an exact scoring mechanism, where '0' may be assigned for a mismatch and '1' may be assigned for a match; or a probabilistic scoring mechanism may be implemented. Various matching techniques along with associated scoring mechanism are explained details in table 1.

In an example, the data matcher 110 may determine a probability based confidence score, based on matching difference, i.e., difference between two items being matched. The scoring model may be, for instance:

When $\Delta\text{diff} > 1$ then $1-\log(\Delta\text{diff})$

When $\Delta\text{diff} == 0$ then $1$

When $\Delta\text{diff} > 0$ and $<=1$ then $1-\log(1+\Delta\text{diff})$

It will be appreciated, the scoring model may be configured, based on requirements and/or user preferences.

Following table 1 provides various matching techniques that may be implemented by the data matcher 110 to perform matching and scoring:

TABLE 1

| # | Matching Technique | Short Description | Details about technique and it's scoring mechanism |
|---|---|---|---|
| 1 | N0N_grp | Many to Many group performs grouping of information on one or more features, such as source, department, date, and the like to get the best match between the ledgers it is trying to reconcile | These are contextual based matching techniques, which may use supporting features, such as certain keywords in description text, or source from where the posting was done, or department, etc., to determine the best match with a high confidence score. The technique is implemented to perform exact match and hence, when scoring is performed it is always in the range of 0-1. In case of a mist-match it may be 0, while in case of a match it may be 1. |
| 2 | Self | With respect to posting there could be reversal with in same source. Self-tag attempts to reconcile those entries/items where there was reversal w.r.t. a posting | |
| 3 | 101 | Matches one-line item with another line item across the sources | |
| 4 | 10N | One-line item matches with group of line items in another source | |
| 5 | N01 | Many line items match with one-line item in another source | |
| 6 | N0N | Many line items match with many line items in another source | |
| 7 | self_amount | Self-match within the same data source using only amount field | These matching techniques use only one field (amount) for matching. There may be no logic or context used for matching. These bunch of techniques may be used in conditions, where only certain line items may be need to be determined. The score may be probabilistic based or it may be just an exact match (i.e.; score = 1). |
| 8 | 101_amount | One-line item match with another line item using only amount field | |
| 9 | 10N_amount | One-line item matched with many line items in another data source using only amount field | |
| 10 | N01_amount | Many line items matched with one-line item in another data source using only amount field | |
| 11 | N0N_amount | Many line items match with many line items in another source using only amount field | |
| 12 | N0N_grp_approx | Many to many group performs grouping of information on one or more features, such as source, department, date, check number, etc., to get the best matching record between two different data sources. It can perform probability based match based on scoring model | These are contextual based matching techniques, which may use supporting features, such as certain word inside description text, source from where the posting was done, or department, etc., to determine the best match with high confidence score. Such techniques provide an approximate match. Such techniques generate a probabilistic based score based on how close was the match |
| 13 | self_approx | Self-match within the same data source using probability based match | |
| 14 | 101_approx | One-line item is matched with one-line item in another source using probability based match | |
| 15 | 10N_approx | One-line item is matched with many line items in another data source using probabilistic based score | |
| 16 | N01_approx | Many line items are match with one-line item in another data source using probabilistic based score | |
| 17 | N0N_approx | Many line items are matched with many line items in another data source using probabilistic based score | |
| 18 | self_amount_approx | Self-match within the same source using only amount field | These techniques use only amount field for matching. The technique determine the best match by selecting the line item, whose sum is very close to the line items it is trying to match. The techniques generate probabilistic based score based on the ability |
| 19 | 101_amount_approx | One-line item is matched with another line item using only amount field | |
| 20 | 10N_amount_approx | One-line item matches with many line items in another source using only amount field | |

TABLE 1-continued

| Matching # Technique | Short Description | Details about technique and it's scoring mechanism |
|---|---|---|
| 21 N01_amount_approx | Many line items are matched match with one-line item in another data source using only amount field | to determine the closest matching line item. |
| 22 N0N_amount_approx | Many line items are matched with many line items in another data source using only amount field | |
| 23 ML Based 1-0-1 | Over a period, the system also learns the rules that user might be using to match the line items. These rules are learned over a period using a decision tree and later used for matching lines items. | |

Based on confidence score generated upon data matching, the reconciler 115 may determine whether the first data set reconciles with the second data set. For instance, thresholds for confidence scores may be predefined. The confidence score greater than a threshold may be identified as "reconciled", where the data source(s) may be adjusted, based on the reconciliation. Further, the reconciler 115 may also generate a reason and/or recommendation explaining the reconciliation. Such reasons/recommendation may not only be used by users for further analysis but may also be used by the feedback-based self learner 125 to continuously update the reconciliation mechanisms to enhance accuracy and minimize external intervention. The reconciler 115 may provide for updating of general ledger, based on reconciliation and remove the reconciled items from data sets or data streams.

However, in case the confidence score is lower than the predefined thresholds, the reconciler 115 may provide such data items to the summarizer 120 for classification. The classification is performed to identify items, which can not be reconciled as there will not be any corresponding data item in another data sources. Further, such items may correspond to items, which need not be reconciled in future.

The summarizer 120 may implement one or more summarization techniques and attempt to classify the data items in to a corresponding classification category. Such data items may appear owing to a variety of reasons, such as bank service fee, check printing charges, transaction fee, wire variance, etc. Accordingly, such data items may be classified in a corresponding category. The summarization, by way of classification into a category, provides for generation of a hypothesis indicative of a probable reason for non-reconciliation such as, outstanding checks, deposit in transit. In an example, the summarizer 120 may trigger a new journal entry corresponding to the summarized item.

A few example categories/hypothesis are provided below:

TABLE 2

| # | Class Name | Description |
|---|---|---|
| 1 | AP-OC | Outstanding AP Checks |
| 2 | BK-SF | Bank Service Fees |
| 3 | CPA-BANK | Current Period Adjustment |
| 4 | CPA-BOOK | Current Period Adjustment - Book |
| 5 | DIT | Deposit in Transit |
| 6 | DV | Deposit Variances |
| 7 | INT-INC | Interest Income |

TABLE 2-continued

| # | Class Name | Description |
|---|---|---|
| 8 | OCO | Outstanding Change Orders |
| 9 | OS | Outstanding Sweep |
| 10 | PPA-BANK | Prior Period Bank |
| 11 | PPA-BOOK | Prior Period Book |
| 12 | RET-CH | Returned Checks not posted |
| 13 | SRV | Starbucks Ring Variances |
| 14 | WV | Wire Variance |

Thus, the summarizer 120 may implement NPL techniques and text mining techniques to identify a suitable category in which non-reconciled items may be classified. Further, the summarizer 120 may implement rules, which along with the NPL techniques and the text mining techniques provide for classification/summarization.

In another example, the summarization may be performed for reconciled items as well. The summarizer 120 may ascertain whether the summarization is to be performed for reconciled items as well as non-reconciled items, or just the non-reconciled items. For instance, a flag may be set to indicate the preference.

In an example, the items, which can not be reconciled or summarized, may be marked as open items. Such, open items may be reconciled/summarized by requesting inputs from an external agent. Further, the feedback-based self learner 125 may also request inputs from an external agent to gather additional information, clarification, and/or approvals to remediate the mismatch.

The inputs from the external agent may be stored, which may be used by the feedback-based self learner 125 to further improvise by learning new matching and summarization rules. For instance, the feedback-based self learner 125 may update the decision tree based on the user feedback. The decision tree may include a plurality of nodes indicating a rule or a sub-rule having an operator to classify the data into matched pairs of the values and unmatched pairs of the values. The decision tree is used by the data matcher 110 to perform data matching.

FIG. 2a-FIG. 2c illustrate an example of data reconciliation performed by the system 100, according to an example of the present disclosure. In an example, the first data set 205 may correspond to a bank statement, and the second data set 210 may correspond to a general ledger. The data gatherer 105 may obtain the first data set 205 and the second data set 210, based on polling or on receiving an alert. The data gatherer 110 may convert the received data in the required format so that both the data sets are in the same format, for example, json format.

The data matcher 110 may perform the data matching on both the data sets to determine matching items and generate a corresponding confidence score. The reconciler 115 may identify the reconciled items, based on confidence score and the summarizer 120 may accordingly summarize the items that could not be reconciled and mark those items, which could not be summarized as open items.

The output generated by the data matcher 110, the reconciler 115 and the summarizer 120 is illustrated in FIG. 2b. As illustrated, the output includes, the reconciled first data set 215, which corresponds to bank statement and the reconciled second data set 220, which corresponds to reconciled general ledger.

Output 225-1 and output 225-2 corresponds to output of the system 100 on ingesting the first data set 205 and the second data set 210. Further, a matching ID 230, may be a unique code, such as a number, assigned to each data item/record in a data source, which is matched with a corresponding data item/record in the other data source. Thus, the records that are matched with each other are assigned a unique matching ID. In the present example, both the bank statement and the general ledger have a unique matching ID 230 to denote, which record in one has matched a record in other.

In an example, a portion of the matching ID 230 may indicate whether the item matched and/or reconciled. Referring to current example, the matching ID 230 starting from 1xxx series may be for reconciliation and 10xxx series may be for summarization. The records, which are not assigned any matching ID are either not reconcilable or cannot be summarized. In an example, a user may be requested to take an appropriate action on these records and the user action may then be feed to the feedback based self learner 125 to learn new matching rules.

Further, the output 225 may include a source ID 235 and a source name 240 to indicate the data source 150 against, which reconciliation is performed. The output 225 may also indicate the type of matching performed in comment section 245.

Referring to the example, the matching performed is explained with help of a few records below:

Matching ID=1000

As indicated by the reconciled first data set 215 and the reconciled second data set 220, there is one record in the bank statement, which has matched with one record in the general ledger. The matching comment says; "1:1 match contextualized with description" which means:

The system 100 could determine one-to-one match between record in the bank statement and the general ledger The system 100 has done a contextual based match by using description field, where the analysis is done based on whether the description of the transaction is similar or not.

The system 100 can use multiple criteria to see where it is similar or not. (not just the description field)

Matching ID=1003

Referring to the reconciled first data set 215 and the reconciled second data set 220, there are two records in the bank statement, which has matched with sum of two records in the general ledger. The matching comment says; "N:N match with amount only" which means:

The system 100 could determine many data items in the bank statement matching with sum of many data items in the general ledger. Here the order of "many" for both the bank statement and the general ledger is 2. It will be appreciated the order of "many" can be dynamic based on multiple iterations that the system 100 does one both the data sources under consideration.

The system 100 has used field "amount" for matching. The system 100 tries to determine match using multiple contexts, but in case a context is not established, the system 100 may only use amount for matching, which is the case in the mentioned example.

Matching ID=1115

Again referring to the reconciled first data set 215 and the reconciled second data set 220, there is one record in the bank statement, which has matched with two records in the general ledger. The matching comment says; "N:N group-by contextualized with check reference" which means:

The system 100 could group the line items on the bank statement and the general ledger side based on check number to match the line items/data items in the bank statement and the general ledger. The grouping could be based on multiple criteria (1:N, N:1, or N:N) based on the learning or business rules that were fed to the system 100.

Matching ID=10000

The matching ID is in 10xxx series, which denotes summarization, which is performed for unmatched lines items in reconciliation. The comment says; "Deposit in Transit" which means:

The system 100 could classify this line item as "deposit in transit" based on the classification criteria learned from the historic data or business rules.

As per business rules, "deposit in transit" is a transaction, which is a deposit in the general ledger and is not reflected in the bank statement, for instance, due to transit state as it has come in last days of the month.

The system 100 identifies this record as a transit line item, which will come in next month statement, hence deposit in transit.

The summarization may be based on one or more approaches, viz., by feeding the knowledge captured from business personnel and/or by learning based on user correction in the system. In an example, domain knowledge captured from the user providing the open items, which are of deposit type and typically occur in the last pre-defined number of days of the period close can be entitled for classification to "Deposit in Transit" which may be learned via an inference engine. In another example, the approach may be to learn based on a correction made by a user, wherein machine learning based techniques are used to understand the correlation in the features that a user used to correct the AI result and further learn this new classification rule.

Open Line Items

As can be seen from the reconciled first data set 215 and the reconciled second data set 220, there is one line item in the bank statement and one line item in the general ledger, which the system 100 could neither reconcile nor classify. These items are marked as open item 255-1 and open item 255-2, for a user to further reconcile or classify. As mentioned before, the operation performed by the user on any line item may further be captured as a training sample for the system 100 by the feedback based self learner 125 to continuously learn new set of matching or summarization rules, which may be used by the data matching techniques and the summarization techniques.

Figure 3:
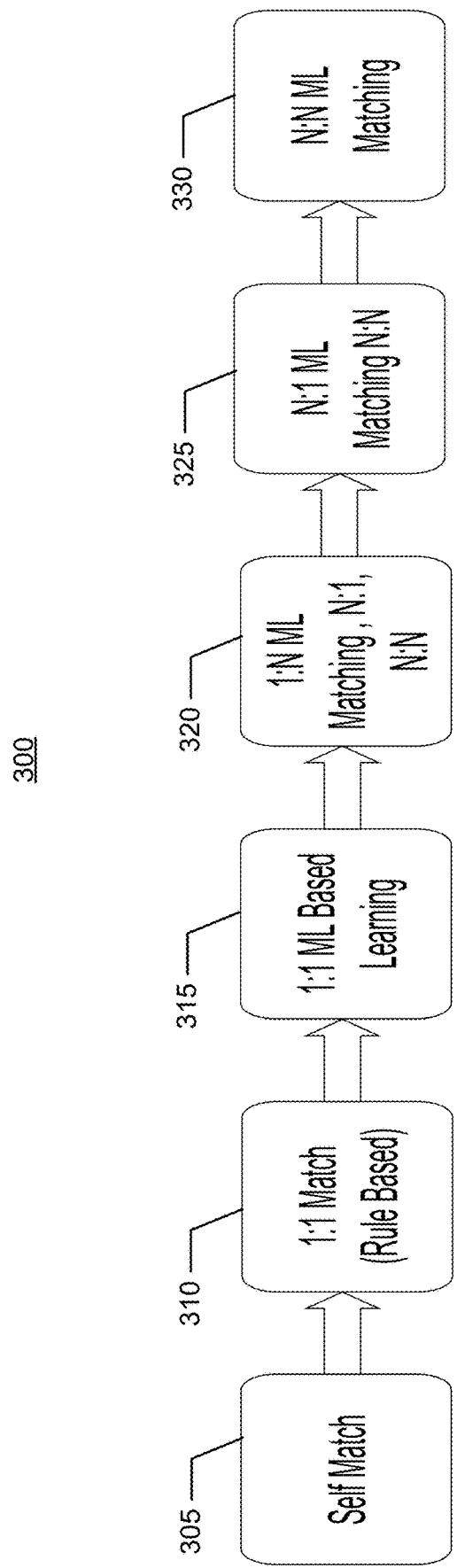
FIG. 3 illustrates a block diagram representation of an example matching process implemented by the reconciliation system, according to an example embodiment of the present disclosure.

FIG. 3 illustrated a reconciliation matching approach 300 implemented by the data matcher 110 of the system 100 for reconciliation for the data sets 205 and 210 of FIG. 2*a*, according to an example of the present disclosure. In an example, at block 305, the data matcher 110 may perform self match, where first self matching rules may be ingested. Upon ingesting self matching rules, self match on different data sources may be performed. At block 310, rule based, one-to-one match may be performed. For the purpose, one-to-one matching rules may be ingested and the unmatched items from self match may undergo one-to-one match. Various fields may be used for match, such as closeness of data, description, and amount. Different confidence scores may be generated, based on these matching combinations.

At block 315, the unmatched items from one to one match may undergo one-to one machine learning based matching. Likewise, at block 320, machine learning based one to N matching may be performed for unmatched items at block 315. At block 325, machine learning based N to one matching may be performed for unmatched items at block 320. At block 330, machine learning based many to many matching may be performed for unmatched items at block 325.

For each of the items matched, a confidence score may be generated for further processing as discussed above.

Figure 4:
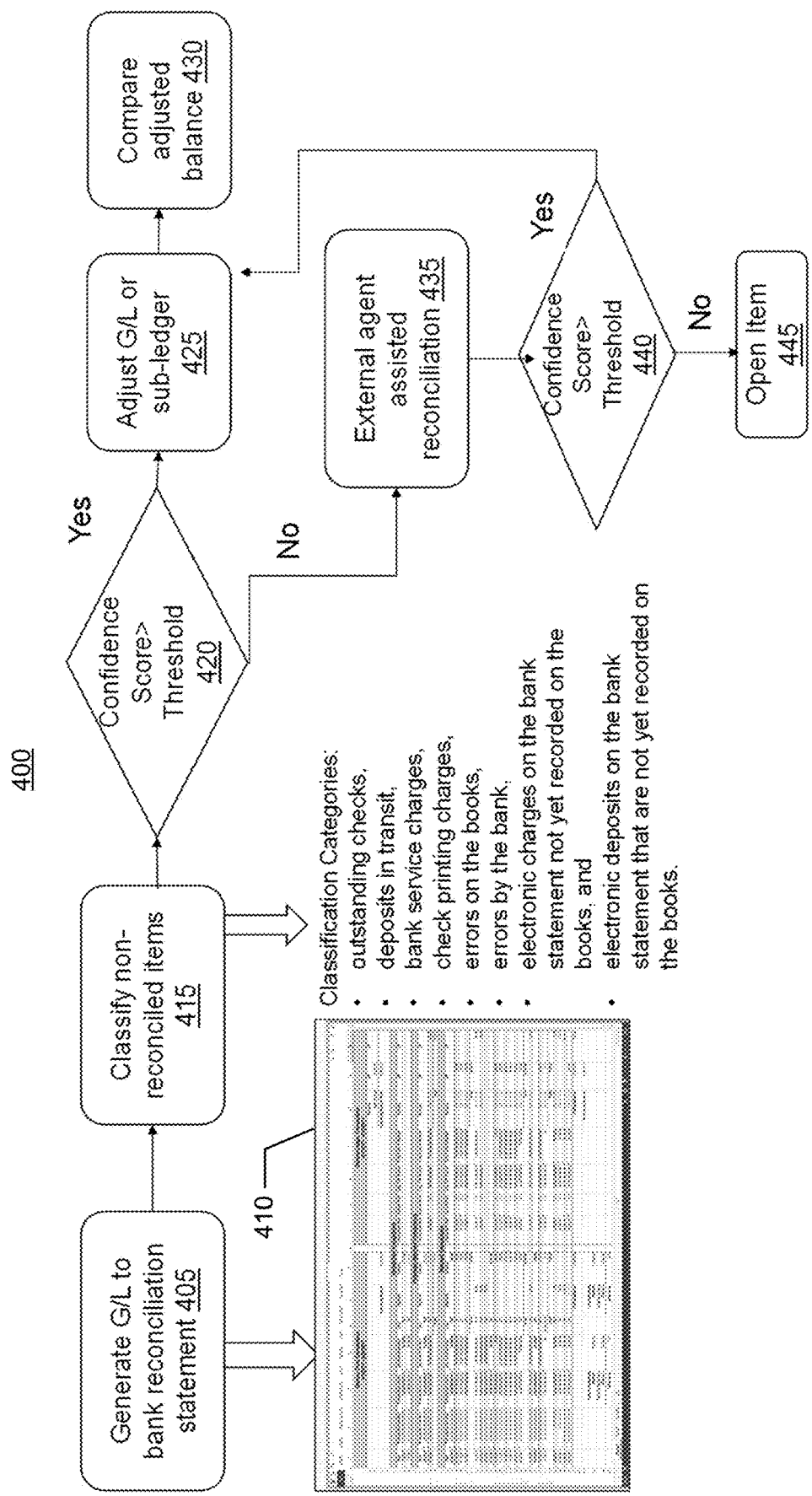
FIG. 4 schematically illustrates a process for continuous bank and cash reconciliation; according to an example embodiment of the present disclosure.

FIG. 4 schematically illustrates continuous bank reconciliation process 400, according to an example of the present subject matter. At block 405, a general ledger to bank reconciliation data 410, such as, the reconciled data 215 and 220 may be generated, for instance, by the data matcher 110. The non-reconciled items may be summarized, for instance, by the summarizer 120, at block 415. The non-reconciled items may be classified into a corresponding category, or to say, a hypothesis may be generated indicative of an explanation of certain items being non-reconcilable. As mentioned before, the non-reconcilable items may be outstanding checks, deposits in transit, errors by the bank, etc. In an example, a probability score may be associated with a class assigned to the record. The probability score may indicate a likelihood of the class being accurate. When the probability score is greater than a predefined threshold, the class may be selected.

At block 420, it may be determined if the confidence score for the reconciled items and the summarized/classified items is greater than a threshold. If the confidence score is greater than a threshold the general ledger and/or the sub-ledger may be adjusted at block 425. At block 430, the adjusted balanced may be compared. Based on the comparison, summarization may be performed again.

For instance, at the end of the reconciliation process the bank and the book side may have to be balanced. In case there is any adjustment that is to be done, for instance, from the bank side, the entries from the bank side may be compared from the general ledger side to ensure that the accounts are balanced and clean. In an example, if any variance is determined, the variance may be recorded in a corresponding section, say, a variance section, to ensure accounts are balanced.

However, if at block 420, the confidence score is less than the threshold, at block 435 inputs from an external agent may be sought to reconcile non-reconciled items and a confidence score may be generated. At block 440, it may again be determined if the confidence score for the reconciled items is greater than a threshold. If the confidence score is determined to be greater than the threshold, the process may branch back to block 425. However, if the confidence score is determined to be less than the threshold, the item may be marked as an open item at block 445.

Thus, in an example, the items that the system 100 is not able to reconcile may be attempted to be reconciled with external assistance; however if such the item is still reconcilable, the item may be marked as "open item" in a ledger.

Figure 5:
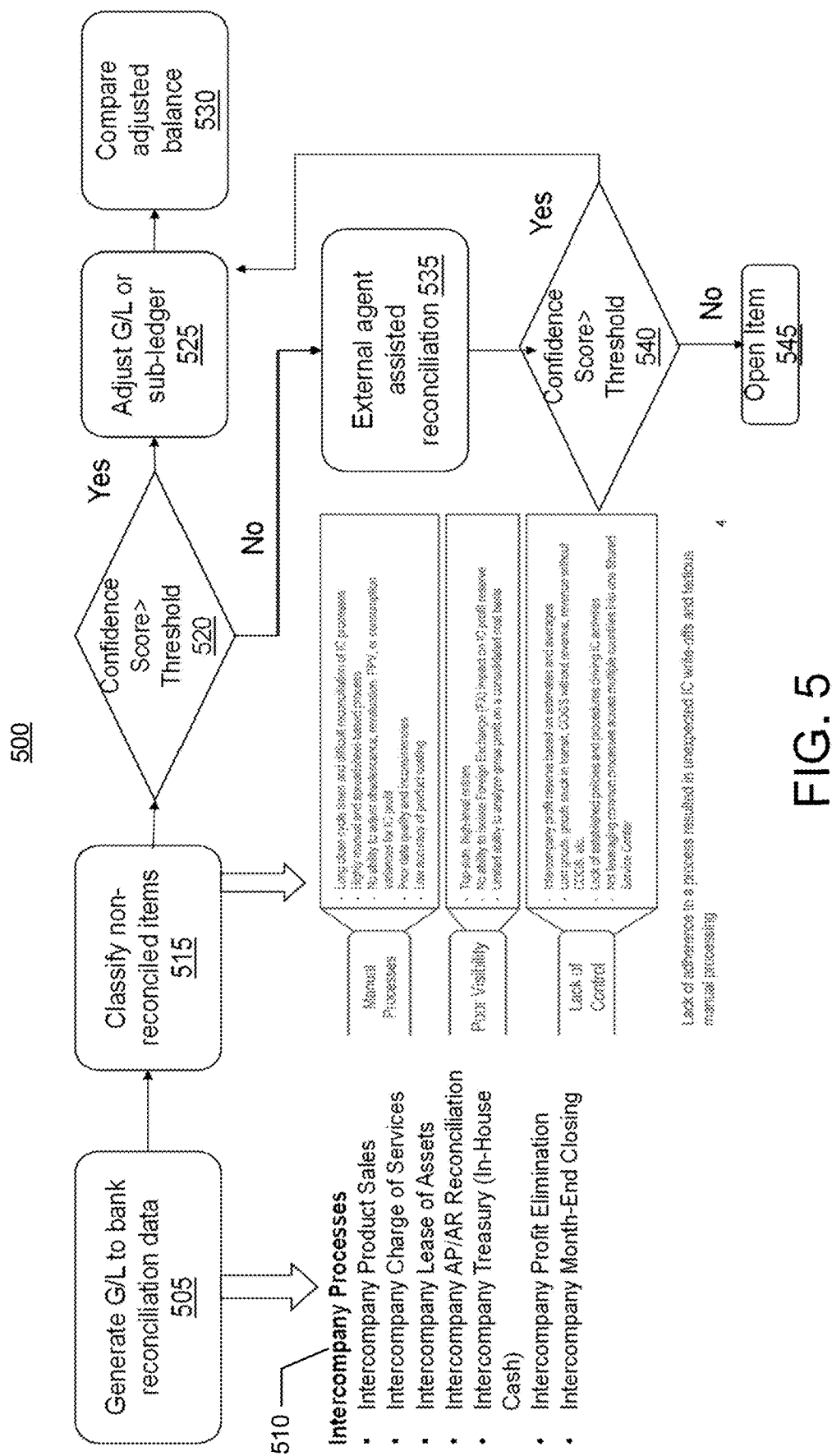
FIG. 5 schematically illustrates a process for continuous intercompany reconciliation; according to an example embodiment of the present disclosure.

FIG. 5 schematically illustrates continuous intercompany reconciliation process 500, according to an example of the present subject matter. At block 505, a general ledger to bank reconciliation data 510 is generated, for instance, by the data matcher 110. The data 510 may include, for instance, intercompany product sales, intercompany charge of services, intercompany lease of assets, intercompany AP/AR reconciliation, intercompany treasury (in house cash), intercompany profit elimination, and intercompany month-end closing.

The non-reconciled items may be summarized, for instance, by the summarizer 120, at block 515. The non-reconciled items may be classified into a corresponding category, or to say, a hypothesis may be generated indicative of an explanation of certain items being non-reconcilable. The reasons (classification) for non-reconcilable items in case of intercompany reconciliation may be manual processes, poor visibility, and lack of control. For instance, lack of adherence to a process may result in unexpected intercompany write-offs and tedious manual processing.

At block 520, it may be determined if the confidence score for the reconciled items and the summarized/classified items is greater than a threshold. If the confidence score is greater than a threshold the general ledger and/or the sub-ledger may be adjusted at block 525. At block 530, the adjusted balanced may be compared.

However, if at block 520, the confidence score is less than the threshold, inputs from an external agent may be sought to reconcile open items and a confidence score may be generated at block 535. At block 540, it may again be determined if the confidence score for the reconciled items is greater than a threshold. If the confidence score is determined to be greater than the threshold, the process may branch back to block 525. However, if the confidence score is determined to be less than the threshold, the item may be marked as an open item at block 545.

Figure 6:
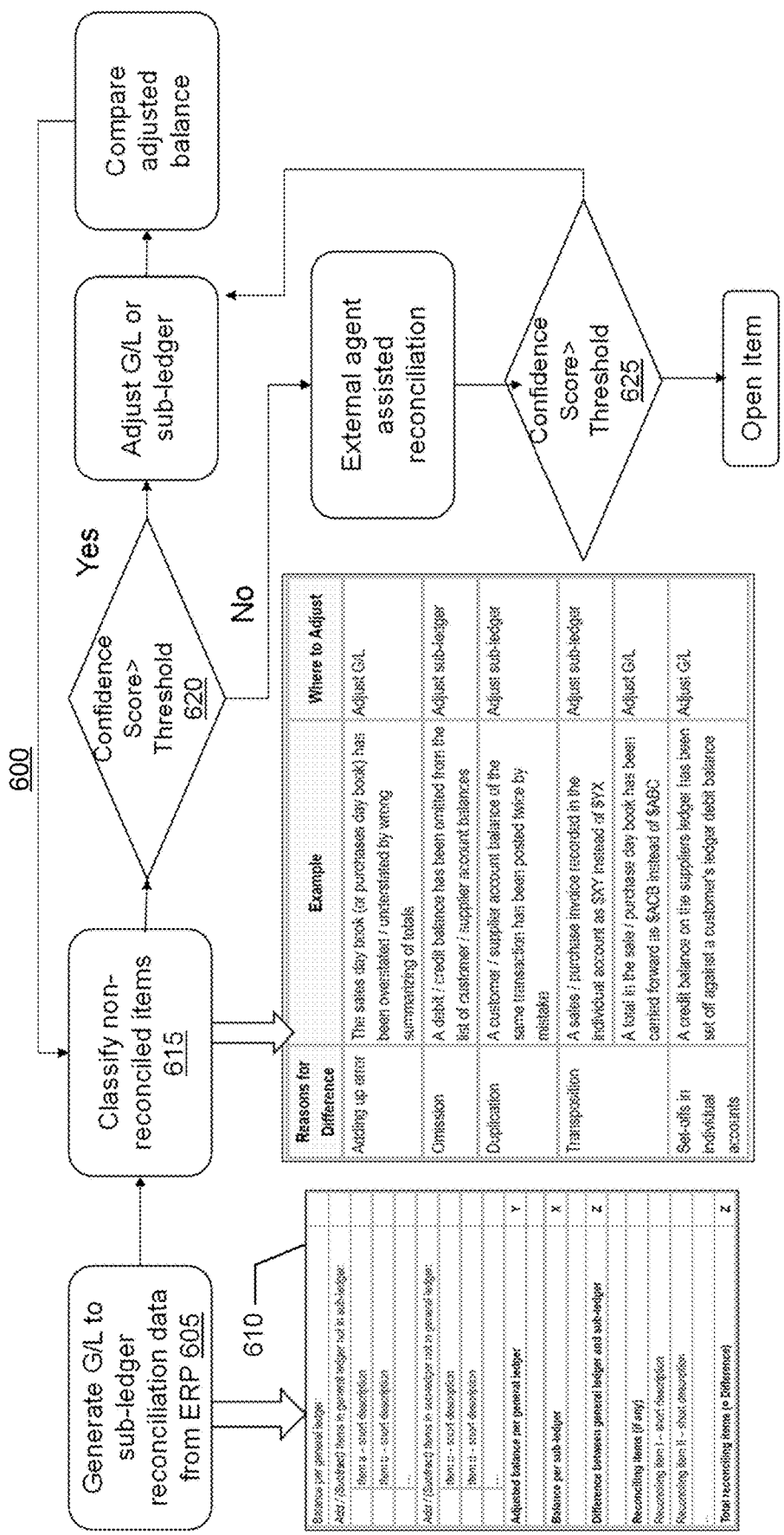
FIG. 6 schematically illustrates a process for continuous ledger to sub-ledger reconciliation; according to an example embodiment of the present disclosure.

FIG. 6 schematically illustrates continuous ledger-subledger reconciliation process 600, according to an example of the present subject matter. At block 605, a general ledger to sub-ledger reconciliation data 610 may be generated from an ERP system, for instance, by the data matcher 110.

The non-reconciled items may be summarized, for instance, by the summarizer 120, at block 515. The non-reconciled items may be classified into a corresponding category, or to say, a hypothesis may be generated indicative of an explanation of certain items being non-reconcilable. The hypothesis/reasoning/classification for non-reconcilable items in case of ledger to sub-ledger reconciliation may be adding up of error, omission, duplication, transposition, and set-offs in individual accounts. Further, summarization may also indicate where to adjust the data.

Subsequently, confidence scores may be generated at block 520 and 525 and reconciliation may be performed as discussed above with respect to processes 400 and 500.

Figure 7:
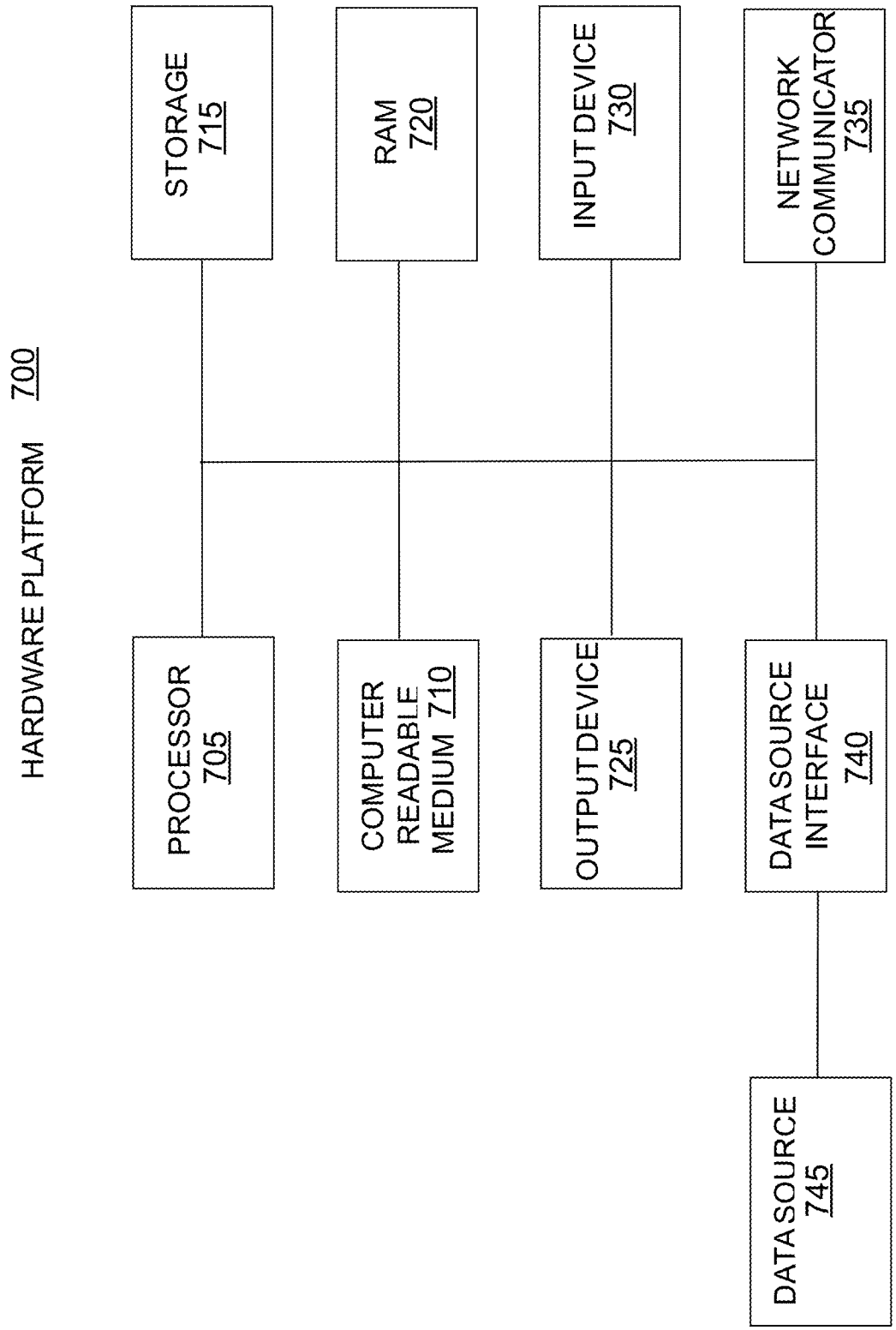
FIG. 7 illustrates a hardware platform for implementation of the system, according to an example of the present disclosure; and FIG. 8a and FIG. 8b illustrates a computer-implemented method for continuous reconciliation, according to an example embodiment of the present disclosure.

FIG. 7 illustrates a hardware platform 700 for implementation of the system 100, according to an example of the present disclosure. In an example embodiment, the hardware platform 700 may be a computer system 600 that may be used with the examples described herein. The computer system 700 may represent a computational platform that includes components that may be in a server or another computer system. The computer system 700 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 700 may include a processor 605 that executes software instructions or code stored on a non-transitory computer readable storage medium 710 to perform methods of the present disclosure. The software code includes, for example, instructions to obtain data, reconcile data, generate confidence score, and perform summarization. In an embodiment, the data gatherer 105, the data matcher 110, the reconciler 115, the summarizer 120, and the feedback based self learner 125 are a software code or a component performing the above steps.

The instructions on the computer readable storage medium 710 are read and stored the instructions in storage 715 or in random access memory (RAM) 720. The storage 715 provides a large space for keeping static data where at least some instructions could be stored for later execution. The stored instructions may be further compiled to generate other representations of the instructions and dynamically stored in the RAM 720. The processor 705 reads instructions from the RAM 720 and performs actions as instructed.

The computer system 700 further includes an output device 725 to provide at least some of the results of the execution as output including, but not limited to, visual information to users, such as external agents. The output device can include a display on computing devices. For example, the display can be a mobile phone screen or a laptop screen. GUIs and/or text are presented as an output on the display screen. The computer system 700 further includes input device 730 to provide a user or another device with mechanisms for entering data and/or otherwise interact with the computer system 700. The input device may include, for example, a keyboard, a keypad, a mouse, or a touchscreen. In an embodiment, output of the intelligent risk management agent is displayed on the output device 725. Each of these output devices 725 and input devices 730 could be joined by one or more additional peripherals.

A network communicator 735 may be provided to connect the computer system 700 to a network and in turn to other devices connected to the network including other clients, servers, data stores, and interfaces, for instance. A network communicator 735 may include, for example, a network adapter such as a LAN adapter or a wireless adapter. The computer system 700 includes a data source interface 740 to access data source 745, such as the data sources 150.

Figure 8A:
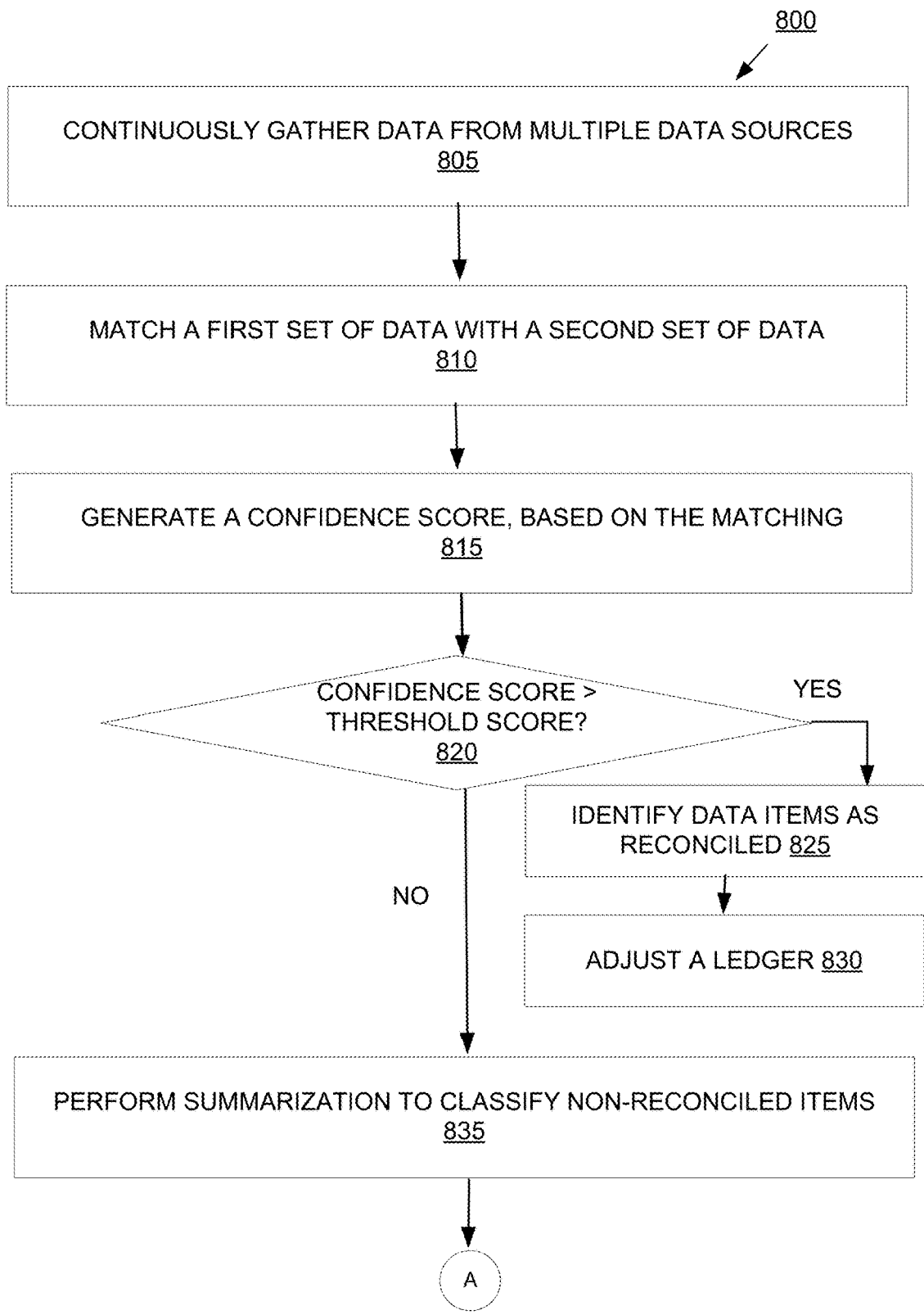
Figure 8B:
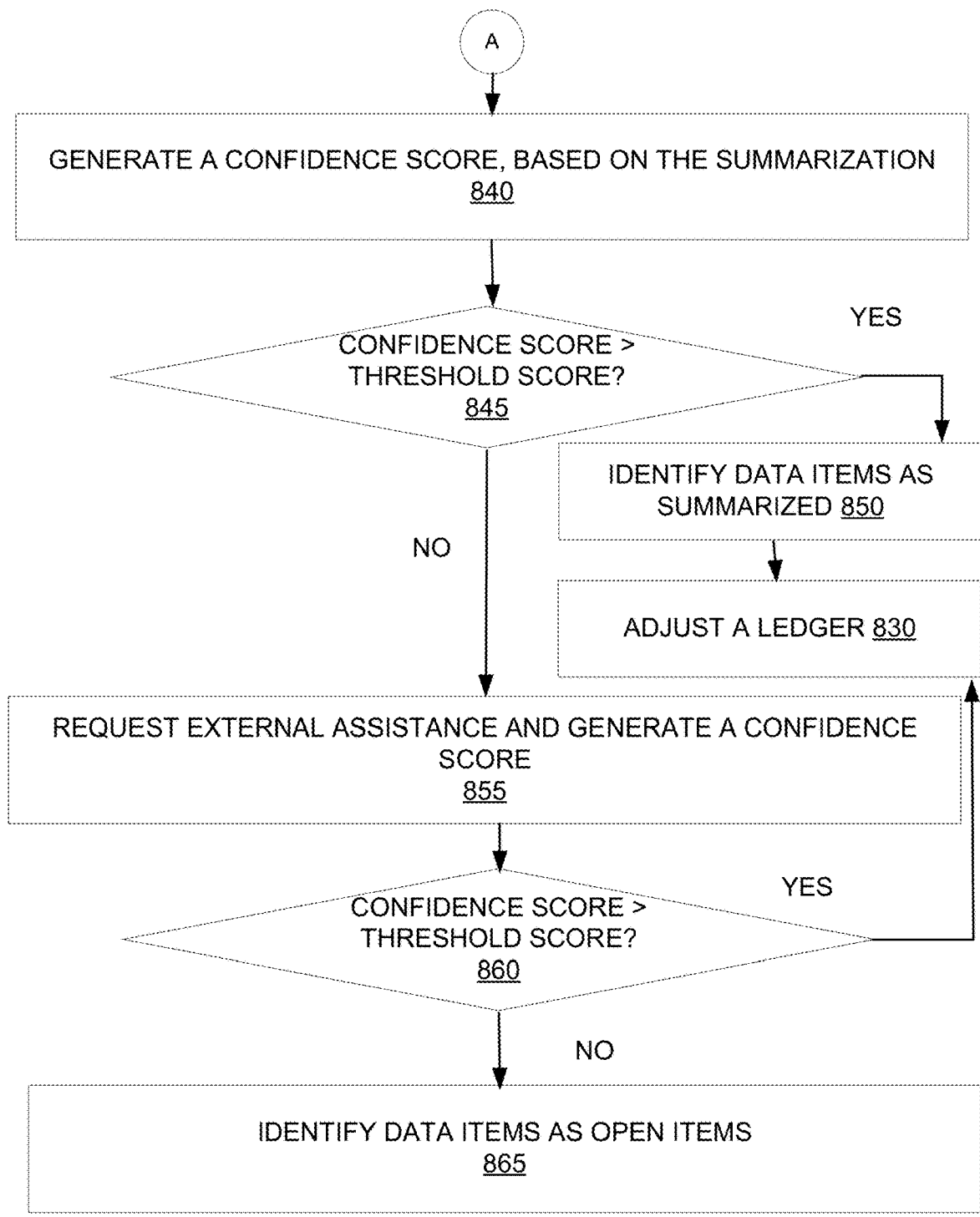

FIGS. 8*a* and 8*b* illustrate a computer-implemented method 800 depicting functionality of the system 100, according to an example embodiment of the present disclosure. For the sake of brevity, construction and operational features of the system 100 which are explained in detail in the description of FIG. 1-FIG. 7 are not explained in detail in the description of FIG. 8.

At method block 805, the method 800 commences by continuously gathering data from multiple data sources, such as the data sources 150. The data sources 150 may be for instance, bank statements and ledgers, such as general ledgers, sub-ledgers, and intercompany ledgers. The data may include a first data set from a first data source and a second data set from a second data source.

At block 810, the first data set may be matched with second data set for reconciliation. The reconciliation may include matching of data using matching techniques, such as self match, rule based matching, and/or machine learning based. Each of the techniques may implement precise or fuzzy logic techniques. Further, using the techniques one to one, one to many, many to one, and many to many matching may be performed. In an example, multiple matching techniques may be implemented in a predefined order, where the non-reconciled data items by a first data matching technique are fed to a subsequent data matching technique as explained with reference to description of FIG. 3.

The matching, in an example, may include filtering of data sets to identify items that may be grouped as a single record, based on various filtering criteria. The filtering criteria may indicative of basis on which the one or more data items in the first data set are to be combined, for instance, based on a specific field, such as account or check reference. As mentioned before, filtering may be based on exact match or based on context, which may be approximate match. Further, for each match, a matching ID may be generated and associated with the items in both the data sets.

At block 815, based on the matching, i.e., the comparison between the two data sets, a confidence score for each match may be generated. The score may be generated, for instance, based on a probabilistic scoring technique or an exact match based on technique. In an example, the data matcher 110 may compare and generate a corresponding matching score.

At block 820, it may be ascertained whether the confidence score for the items is greater than a threshold score. A threshold score may be selected such that a match with the score greater than the threshold have a likelihood, say more than 99% probability, of being correct. The threshold may be configurable and may be adjusted, based on preferences. For instance, the reconciler 115 may determine if the confidence score is greater than the threshold.

If at block 820, it is determined that the confidence score is greater than the threshold, the method 800 may branch ('Yes' branch) to block 825, where the items may be identified as 'reconciled' indicating that the items have been successfully reconciled. Further, such items may be removed from the data sets. Further, at block 830, a ledger, which may be a general ledger, a sub-ledger, or an intercompany ledger, may be adjusted.

However, if at block 820, it is ascertained that the confidence score is not greater than the threshold score, the method 800 may proceed to ('No' branch) to block 835. At block 835, summarization may be performed to classify non-reconciled items. The summarization may include hypothesis generation by way of classification of the items to a category, which is indicative of a reason because of which the item would not have been reconciled. Thus, when a non-reconciled item is classified to a category, the classification may itself explain as to why such an item was non-reconcilable. The classification category may be determined based on a type of reconciliation being performed, where the type of reconciliation is based on the data sources being used for reconciliation. Different categories are explained in detail with reference to description FIG. 4-FIG. 6. For instance, in case of bank to ledger reconciliation, check printing charges may not be reconcilable and it may act as one of the classification categories/hypothesis. In an example, the summarizer 125 may summarize the items.

It will be appreciated that all non-reconcilable items may not be classifiable and may be identified, as explained in subsequent blocks. Further, rules corresponding to predefined categories/hypothesis may be predefined and AI based techniques, such as NPL techniques may be used to identify the category/hypothesis. Additionally, a matching ID may also be associated with each summarized/classified item.

At block 840, again a confidence score may be generated for the summarization.

At block 845, it may be ascertained if the confidence score for summarization is greater than a threshold score. When the confidence score is greater than the threshold, the item may be considered as summarized as indicated at block 850 and the method 800 may move to block 830, where the ledger may be adjusted.

However, when the confidence score is not greater than the threshold, external assistance may be requested as indicated at block 855. At block 855, based on the inputs, reconciliation may be performed and a confidence score may be generated.

At block 860, it may be ascertained if the confidence score for external agent assisted reconciliation is greater than a threshold score. When the confidence score is greater than the threshold, the item may be considered as reconciled/summarized and the method 800 proceeds to block 830, where the ledger may be adjusted. Further, the feedback based self learner 125 may update existing rules, based in the inputs from the external agent.

However, if at block 860 the confidences score for external agent assisted reconciliation is greater than the threshold score, the data items may be marked as open items at block 865.

What has been described and illustrated herein are examples of the present disclosure. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A reconciliation system comprising:
a processor;
a data gatherer coupled to the processor to continuously gather data for performing reconciliation operations, wherein the data includes a first data set from a first source and a second data set from a second source;
a data matcher coupled to the processor to continuously match data items in the first data set with the data items in the second data set using a data matching technique, wherein the data matcher is to,
filter the first data set and the second data set to identify one or more data items in each data set to be grouped as a single record, based on a filtering criteria, the filtering criteria being indicative of a basis based on which the one or more data items in at least one of the first data set and the second data set are to be combined;
compare filtered data pertaining to the first data set with filtered data pertaining to the second data set to determine matching data items by implementing a plurality of data matching techniques in a predefined order, wherein the plurality of data matching techniques includes a self-match technique, a rule based technique, a one to one machine learning technique, a one to N machine learning technique, and an N to 1 machine learning technique, and wherein the non-reconciled data items are processed by the self-match technique and unmatched data items from the self-match technique are fed to the rule based technique and processed by the rule based technique, and wherein unmatched data items from the rule based technique are fed to and processed by at least one of the one to one machine learning technique, the one to N machine learning technique, and the N to 1 machine learning technique; and
based on the comparing, generate a confidence score indicative of an extent of match between the filtered data of the first data set and the filtered data of the second data set;
a reconciler coupled to the processor to,
ascertain whether the filtered data in the first data set is reconciled with the filtered data with the second data set, based on the confidence score and predefined score thresholds; and
adjust at least one of the first data source and the second data source, when the filtered data in the first data set is reconciled with the filtered data in the second data set;
and a summarizer coupled to the processor to,
classify a non-reconciled data item in at least one of the first data set and the second data set in a classification category, based on an artificial intelligence based technique, the classification category being indicative of an explanation for the non-reconciled data item being non-reconcilable; and
when the data item is summarized, identify the data item as an open item for further analysis.

2. The system as claimed in claim 1, wherein the data matching technique is to implement one of a precise match technique and a fuzzy logic technique.

3. The system of claim 1, wherein the first source and the second source is one of a general ledger, a bank statement, an intercompany ledger, and a sub ledger.

4. The system of claim 1, wherein the summarizer is to classify the one or more of non-reconciled data items, based on a type of reconciliation being performed, the type of reconciliation being based on the first data source and the second data source.

5. The system as claimed in claim 1, wherein at least one of the reconciler and the summarizer is to request an input from an external agent, when the data item is not reconciled or summarized.

6. The system as claimed in claim 5, wherein the system further comprises a feedback based self learner to update rules implemented by the data matching techniques, based on the input received from the external agent.

7. A method comprising:
gathering, continuously, data for performing reconciliation operations, wherein the data includes a first data set from a first source and a second data set from a second source;
matching data items in the first data set with the data items in the second data set using a data matching technique, wherein the data matcher is to,
filter the first data set and the second data set to identify one or more data items in each data set to be grouped as a single record, based on a filtering criteria, the filtering criteria being indicative of a basis based on which the one or more data items in at least one of the first data set and the second data set are to be combined;
compare filtered data pertaining to the first data set with filtered data pertaining to second data set to determine matching data items by implementing a plurality of data matching techniques in a predefined order, wherein the plurality of data matching techniques includes a self-match technique, a rule based technique, a one to one machine learning technique, a one to N machine learning technique, and an N to 1 machine learning technique, and wherein the non-reconciled data items are processed by the self-match technique and unmatched data items from the self-match technique are fed to the rule based technique and processed by the rule based technique, and wherein unmatched data items from the rule based technique are fed to and processed by at least one of the one to one machine learning technique, the one to N machine learning technique, and the N to 1 machine learning technique; and based on comparing, generate a confidence score indicative of an extent of match between the filtered data of the first data set and the filtered data of the second data set;

ascertaining whether the filtered data of the first data set is reconciled with the filtered data of the second data set, based on the confidence score and predefined score thresholds;

when a data item in at least one of the first data set and the second data set is not reconciled, classifying the data item i in a classification category, based on an artificial intelligence based technique, the classification category being indicative of an explanation of the data item being non-reconcilable;

adjusting at least one of the first data source and the second data source, based on reconciliation and classification; and when the data item is not classified, identifying the data item as an open item for further analysis.

8. The method as claimed in claim 7, wherein the data matching technique is to implement one of a precise match technique and a fuzzy logic technique.

9. The method as claimed in claim 7, wherein the first source and the second source is one of a general ledger, a bank statement, an intercompany ledger, and a sub ledger.

10. The method as claimed in claim 7, wherein the classification is based on a type of reconciliation being performed, the type of reconciliation being based on the first data source and the second data source.

11. The method as claimed in claim 7, wherein the method further comprises requesting an input from an external agent, when the data item is not reconciled or classified.

12. The method as claimed in claim 11, the method further comprises updating rules for data matching and classification, based on the input received from the external agent.

13. A non-transitory computer readable medium including machine readable instructions that are executable by a processor to:

gather data, continuously, for performing reconciliation operations, wherein the data includes a first data set from a first source and a second data set from a second source;

match data items in the first data set with the data items in the second data set using a data matching technique, wherein the data matcher is to, filter the first data set and the second data set to identify one or more data items in each data set to be grouped as a single record, based on a filtering criteria, the filtering criteria being indicative of a basis based on which the one or more data items in at least one of the first data set and the second data set are to be combined;

compare the filtered data pertaining to the first data set with the filtered data pertaining to second data set to determine matching data items by implementing a plurality of data matching techniques in a predefined order, wherein the plurality of data matching techniques includes a self-match technique, a rule based technique, a one to one machine learning technique, a one to N machine learning technique, and an N to 1 machine learning technique, and wherein the non-reconciled data items are processed by the self-match technique and unmatched data items from the self-match technique are fed to the rule based technique and processed by the rule based technique, and wherein unmatched data items from the rule based technique are fed to and processed by at least one of the one to one machine learning technique, the one to N machine learning technique, and the N to 1 machine learning technique; and based on comparing, generate a confidence score indicative of an extent of match between the filtered data of the first data set and the filtered data of the second data set;

ascertain whether the filtered data in the first data set is reconciled with the filtered data in the second data set, based on the confidence score and predefined score thresholds;

classify a non-reconciled data item in at least one of the first data set and the second data set in a classification category, based on an artificial intelligence based technique, the classification category being indicative of an explanation of the data item being non-reconcilable;

adjust at least one of the first data source and the second data source, based on reconciliation and classification; and when the data item is not classified, identify the data item as an open item for further analysis.

14. The non-transitory computer readable medium as claimed in claim 13 wherein the data matching technique is to implement one of a precise match technique and a fuzzy logic technique.

15. The non-transitory computer readable medium as claimed in claim 13, wherein the processor is to perform the classification, based on a type of reconciliation being performed, the type of reconciliation being based on the first data source and the second data source.

16. The non-transitory computer readable medium as claimed in claim 13, wherein the processor is to:

request an input from an external agent, when the data item is not reconciled or summarized; and update rules for data matching and classification, based on the input received from the external agent.

17. The non-transitory computer readable medium as claimed in claim 13, wherein the processor is to request an input from an external agent, when the data item is not reconciled or classified.

* * * * *